United States Patent [19]

Smith

[11] 4,153,466
[45] May 8, 1979

[54] COMPOSITIONS COMPRISING PHOSPHATE SALTS OF POLY-2-OXAZOLINE AND FIRE RETARDANT FORMULATIONS

[75] Inventor: William L. Smith, Midland, Mich.

[73] Assignee: The Dow Chemical Company, Midland, Mich.

[21] Appl. No.: 845,189

[22] Filed: Oct. 25, 1977

[51] Int. Cl.$^2$ .................. C08L 79/02; C09D 5/18
[52] U.S. Cl. .................. 106/15.05; 162/159; 252/8.1; 428/276; 528/423
[58] Field of Search ... 260/2 R, 77.5 R, 45.9 NP (U.S. only); 106/15 FP; 162/159; 428/276; 528/423 (U.S. only)

[56] References Cited

U.S. PATENT DOCUMENTS

| | | | |
|---|---|---|---|
| 2,523,626 | 9/1950 | Jones et al. | 106/15 FP |
| 3,247,134 | 4/1966 | Hwa et al. | 260/45.9 NP |
| 3,398,019 | 8/1968 | Langguth et al. | 162/159 |
| 3,479,211 | 11/1969 | Goldstein | 162/159 |
| 3,483,141 | 12/1969 | Litt et al. | 260/2 EN |
| 3,565,679 | 2/1971 | Strother, Jr. | 428/276 |
| 3,640,909 | 2/1972 | Jones et al. | 260/2 BP |
| 3,947,276 | 3/1976 | Siclari et al. | 106/15 FP |
| 3,955,987 | 5/1976 | Schaar et al. | 106/15 FP |
| 3,986,881 | 10/1976 | Oberley | 106/15 FP |
| 4,038,451 | 7/1977 | Brown et al. | 428/274 |
| 4,065,413 | 12/1977 | MacInnis et al. | 260/45.9 NP |
| 4,076,580 | 2/1978 | Panusch et al. | 106/15 FP |
| 4,076,871 | 2/1978 | Short et al. | 106/15 FP |

Primary Examiner—Harold D. Anderson
Assistant Examiner—R. A. White
Attorney, Agent, or Firm—G. R. Plotecher

[57] ABSTRACT

The title compositions impart fire retardancy to and are not readily leached from various cellulosic substrates. For example, wood treated with a composition comprising a phosphate salt of poly(2-ethyl-2-oxazoline) and a 40:60 mixture of mono- and diammonium phosphate is not only rendered fire retardant but the phosphates exhibit good resistance to leaching.

28 Claims, No Drawings

COMPOSITIONS COMPRISING PHOSPHATE SALTS OF POLY-2-OXAZOLINE AND FIRE RETARDANT FORMULATIONS

BACKGROUND OF THE INVENTION

1. Field of the Invention:

This invention relates to fire retardant compositions. In one aspect, the invention relates to novel compositions comprising various fire retardant formulations and poly-2-oxazolines while in another aspect, the invention relates to the use of such compositions.

2. Description of the Prior Art:

Certain inorganic salts, e.g. phosphates, borates, sulfonates, etc., are well known fire retardants for cellulosic substrates. However, these salts have high moisture regain properties at relative humidities in excess of 50 percent which causes the salts to migrate to the surface of a treated substrate. This migration not only depletes the salt content of the substrate, rendering it less fire retardant, but can also severely disfigure the surface.

For certain salts, this migration can be inhibited by combining the salt with a polyalkylene-polyamine. For example, Strother, U.S. Pat. No. 3,565,679, teaches imparting fire retardancy to cellulosic substrates by treating same with a leach-resistant complex of a polyalkylenepolyamine and a condensation product of phosphorus pentoxide and ammonia. Brown and Potter, U.S. Pat. No. 4,038,451, teach similarly except their leach-resistant composition comprises a polyalkylenepolyamine and a mixture of mono- and diammonium phosphates. Brown and Gooch, "Compositions Comprising Polyalkylenepolyamines and 4-Component Inorganic Salt Fire Retardant Formulations", Ser. No. 784,989 and filed Apr. 12, 1977, also teach similarly except their leach-resistant compositions comprise a 4-component fire retardant formulation consisting essentially of ammonium sulfate, boric acid, and two components selected from the group consisting of zinc halide, alkali metal dichromate, diammonium phosphate and alkali metal tetraborate. Although each of these teachings disclose the use of various polyalkylenepolyamines in combination with an inorganic salt, none disclose the phosphate salt of such a material and the superior results that accompany its use.

SUMMARY OF THE INVENTION

According to this invention, a composition comprising a phosphate salt of a poly-2-oxazoline having a weight average molecular weight of at least about 1000 and a fire retardant formulation not only imparts fire retardancy to various cellulosic substrates, but also demonstrates enhanced leach resistance.

DETAILED DESCRIPTION OF THE INVENTION

Poly-2-oxazolines, also known as N-acylated, linear polyalkylenimines, are used in the practice of this invention. Poly-2-oxazolines are known compounds consisting of n randomly-joined units (I, II) and are readily prepared by the ring-opening polymerization of 2-oxazolines or like compounds (III), followed by either full or partial hydrolysis.

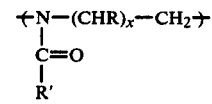

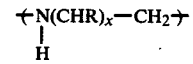

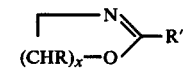

The substituents and subscripts are hereinafter defined. The ring-opening polymerization of 2-oxazoline monomers is generally conducted in the presence of a cationic polymerization catalyst at a reaction temperature of about 0° C.–200° C. Typical catalysts include strong mineral acids, organic sulfonic acids and their esters, acidic salts such as ammonium sulfate, Lewis acids such as aluminum trichloride, stannous tetrachloride, boron trifluoride and organic diazoniumfluoroborates, dialkyl sulfates and other like catalysts. This ring-opening polymerization is further described by Tomalia et al., *J. Polymer Science*, 4, 2253 (1966); Bassiri et al., *Polymer Letters*, 5, 871 (1967); Seeliger, Ger. 1,206,585; Jones and Roth, U.S. Pat. No. 3,640,909; and Litt et al., U.S. Pat. No. 3,483,141.

The pre-hydrolyzed polymers thereby obtained are linear, N-acylated polyethylen- or polypropylenimines having a molecular structure consisting essentially of repeating units (I). These polymers are easily converted (deacylated) to the phosphate salt by acid hydrolysis with phosphoric acid. The partially deacylated poly-2-oxazolines, i.e., the phosphate salts of poly-2-oxazoline, have a molecular structure consisting essentially of the randomly-joined units (I) and (II), illustratively depicted as:

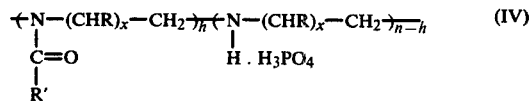

wherein:
- n is the total number of units or degree of polymerization;
- h is the number of acylated units; and
- n-h is the number of phosphorylated (deacylated) units.

The phosphate salts of the poly-2-oxazolines here used include both the fully and partially phosphorylated polymers. Partially phosphorylated poly-2-oxazolines have at least one phosphorylated secondary amine group

per polymer chain as in (IV) where n-h is at least 1. Preferably, the poly-2-oxazolines here used are at least about 25 percent phosphorylated (n-h is at least about 25 percent of n) and more preferably at least about 40 percent phosphorylated (n-h is at least about 40 percent of n). Although fully phosphorylated poly-2-oxazolines (n-h is or is about 100 percent of n) can be used, preferably the poly-2-oxazolines are phosphorylated to a maximum of about 90 percent (n-h is about 90 percent of n) and more preferably phosphorylated to a maximum of about 70 percent (n-h is about 70 percent of n).

As regards the heretofore undefined substituents and subscripts in the above formulae, R is typically hydrogen or $C_1$–$C_3$ alkyl; R' is typically hydrogen, phenyl or alkyl having up to about 18 carbon atoms or an inertly-substituted derivative thereof; and x is 1 or 2. As used herein, "2-oxazoline" includes both poly-2-oxazoline monomers, i.e., x is 1, and 2-oxazine monomers, i.e., x is 2, and "poly-2-oxazoline" includes both poly-2-oxazoline polymers and poly-2-oxazine polymers. By such terms as "inertly-substituted" is meant that the substituents neither preclude the polymerization of the 2-oxazoline monomers nor preclude the hygroscopicity characteristics of the phosphate salts of the poly-2-oxazolines. Illustrative inert substituents include halogen, alkenyl hydrocarbons, alkoxy, ester, etc. Exemplary R substituents include hydrogen, methyl, ethyl and propyl and exemplary R' substituents include hydrogen, methyl, ethyl, propyl, pentyl, cyclohexyl, dodecyl, octadecyl, and the various halogenated, ethylenically unsaturated, etc., derivatives of each such as poly(2-trichloromethyl-2-oxazoline), poly(2-isopropenyl-2-oxazoline), etc. The partially hydrolyzed phosphate salts of poly(2-methyl-2-oxazoline), poly(2-ethyl-2-oxazoline), and poly(2-H-2-oxazolines) are preferred.

Phosphate salts of poly-2-oxazolines having a weight average molecular weight of at least about 1000, as determined by the intrinsic viscosity-universal calibration curve, are used in the practice of this invention. Typically these compounds have a weight average molecular weight of at least about 10,000 and preferably of at least about 250,000. Practical considerations, such as preparation, mechanical application, and the like are the only limitations upon these compounds' average maximum molecular weight although in deference to convenience a maximum of about 1,000,000 is preferred. A maximum of about 500,000 is most preferred.

Any fire retardant formulation that will impart fire retardance to a cellulosic substrate and is compatible with the phosphate salts of poly-2-oxazoline can be used in the practice of this invention. These formulations are well-known in the art and generally comprise mixtures of inorganic salts (although the formulation can consist of a single salt). For example, suitable formulations include: monoammonium phosphate, diammonium phosphate, ammonium sulfate, boric acid, zinc chloride, sodium dichromate, potassium tetraborate, etc. and various mixtures of these salts, such as those described in the American Wood-Preserver's Association Standard P10-68. Formulations comprising mixtures of mono- and diammonium phosphate are particularly preferred with mixtures containing 20 to about 80 weight percent monoammonium phosphate especially preferred. Most preferably, the fire retardant formulation comprises about 35 to about 45 weight percent monoammonium phosphate with the remainder diammonium phosphate.

The respective concentrations of the phosphate salt of the poly-2-oxazoline and the fire retardant formulation in the composition of this invention can vary widely; the exact amounts of each depending upon the substrate and the degree of both fire retardancy and hygroscopicity suppression desired. A phosphate salt of a poly-2-oxazoline concentration of at least about 2 weight percent and preferably of about 5 weight percent, is generally satisfactory. A maximum poly-2-oxazoline as the phosphate salt concentration of about 50 weight percent and preferably of about 20 weight percent, is used in deference to economic considerations. Of course, the remaining weight percents consist of the fire retardant formulation, i.e., a minimum of about 50 weight percent and preferably of about 80 weight percent, and a maximum of about 98 weight percent and preferably of about 95 weight percent, respectively.

The composition of this invention is applied to a cellulosic substrate in any conventional manner, e.g., spraying, painting, dipping, roll coating, reverse roll coating, pressure or vacuum treating, precipitation on fiber slurries, impregnating, etc. Typically, the composition is dissolved in an aqueous medium which is then applied to the cellulosic substrate. Sufficient composition is generally dissolved to form an aqueous solution having a concentration of at least about 5 weight percent and preferably of about 10 weight percent, solids basis. A maximum aqueous concentration of about 50 weight percent and preferably of about 20 weight percent, is used in deference to both economics and the composition's general solubility. The aqueous medium can be water per se or can be an aqueous solution or dispersion comprising other materials, such as pigments and sealers. The dissolved aqueous composition is generally applied to the substrate in an amount sufficient to either thoroughly wet the surface of the substrate or thoroughly impregnate the substrate, depending upon the method of application and the degree of protection desired. As regards surface application, on a solids basis, the substrate is usually contacted with at least about 0.005 pound and preferably about 0.01 pound of composition per square foot of substrate surface. Practical considerations, such as economy, etc., are the only limitations on the maximum amount of composition that is contacted with the substrate, although convenience prefers about 0.05 pound and most preferably about 0.03 pound, of composition per square foot of substrate surface. As regards impregnation, again on a solids basis, the substrates are usually impregnated with the composition to at least about 5 weight percent and preferably to about 10 weight percent of its (substrates) untreated weight. Similar to the surface application, practical considerations are the only limitations upon the maximum amount of composition that can be impregnated into the substrate, although convenience prefers impregnating with the composition to a maximum of about 70 weight percent and most preferably to a maximum of 50 weight percent of the substrates untreated weight. After application, the treated substance is normally dried at elevated temperatures to remove the solvent (water).

Although the composition is typically dissolved in an aqueous medium prior to its application to a cellulosic substrate, the composition can be dissolved in a suitable organic medium if desired. Suitable organic mediums solubilize both the poly-2-oxazoline and the fire retardant formulation and can also include other materials, such as sealers and pigments. Chlorinated solvents are typical organic mediums and include methylene chloride, chloroform, perchloroethylene, etc. Solution and application concentrations comparable to the aqueous medium concentrations are used.

"Cellulosic substrates" include wood, wood composites, wood-derived products and combinations thereof. Any cellulosic substrate capable of receiving an application of an aqueous composition comprising a phosphate salt of a poly-2-oxazoline and a fire retardant formulation can be used in the practice of this invention. Typical examples include: wood, such as pine, cedar, oak, etc.; wood composites, such as particle- and fiberboard and plywood, etc.; wood-derived products, such as veneer and paper, etc.; and combinations thereof, such as paper-coated hard board and particle board, veneer-surfaced particle board, and the like.

The following examples are illustrative embodiments of this invention. Unless otherwise noted, all parts and percentages are by weight.

SPECIFIC EMBODIMENTS

Examples 1–6 and Comparisons A–J: Hygroscopicity

Oven-dried Ponderosa pine wafers were vacuum-pressure treated in aqueous solutions of various polyalkylenepolyamines (PAPA) and a fire retardant formulation. The treating procedure comprised a vacuum for 30 minutes followed by exposure to the treating solution at atmospheric pressure and ambient temperature. The wafers were then recovered, air-dried for a minimum of two days, and then oven-dried for 18 hours at 105° C.

The aqueous treating solutions were prepared by dissolving appropriate amounts of a PAPA and a fire retardant formulation in deionized water (450 grams) to obtain both the desired PAPA:formulation ratio and solids by weight formulation. FR-A ®, a 40 percent monobasic ammonium phosphate/60 percent dibasic ammonium phosphate fire retardant formulation manufactured by Monsanto Company, was the formulation here used. The PAPAs used were a 50 percent phosphorylated poly-(2-ethyl-2-oxazoline) (PS-PEO) having a weight average molecular weight of about 150,000, poly-2-H-2-oxazoline (PHO) having a weight average molecular weight of about 2000, and PEI 600 (a polyethylenimine having a number average molecular weight of about 40,000 to about 60,000 and manufactured by The Dow Chemical Company).

Percent solids retention was determined by substracting the wafer's oven-dried weight treatment from the wafer's oven-dried weight after treatment, dividing the difference thus obtained by the wafer's oven-dried weight before treatment and multiplying the resulting quotient by 100. Moisture regain was determined by placing the oven-dried, treated wafer in a constant humidity chamber for a determined period of time, subtracting the wafer's pre-humidity chamber weight from the wafer's post-humidity chamber weight, dividing the obtained difference by the wafer's pre-humidity chamber weight and multiplying by 100. Moisture regain measurements were made at 66, 75 and 90 percent relative humidities with wafers treated with each of the various aqueous treating solutions. Wafers prepared under Examples 1–6 and Comparisons A–G had a residence time of 50 days in their respective humidity chambers. Wafers prepared under Comparisons H–J had a residence time of 35 days in their respective humidity chambers.

Retention and moisture regain results are reported in Table I.

TABLE I

| | | Hygroscopicity | | | | | | |
|---|---|---|---|---|---|---|---|---|
| | | Aqueous Treating Solution | | | | Moisture Regain (%) | | |
| | | PAPA | FR-A | Solids | Retention | % Relative Humidity | | |
| Ex. | PAPA | (parts) | (parts) | (%) | (%) | 66 | 75 | 90 |
| 1 | PS-PEO | 6 | 94 | 10 | 8.7 | 11.7 | 13.5 | 18.3 |
| 2 | PS-PEO | 6 | 94 | 20 | 44.5 | 8.4 | 9.7 | 13.7 |
| 3 | PS-PEO | 6 | 94 | 30 | 70.3 | 7.3 | 8.8 | 12.3 |
| 4 | PS-PEO | 12 | 88 | 10 | 19.5 | 10.8 | 12.3 | 16.9 |
| 5 | PS-PEO | 12 | 88 | 20 | 42.8 | 8.9 | 10.6 | 14.5 |
| 6 | PS-PEO | 12 | 88 | 30 | 63.9 | 8.2 | 9.7 | 13.9 |
| Com. | | | | | | | | |
| A | PHO | 12 | 88 | 10 | 18.2 | 11.0 | 13.4 | 18.9 |
| B | PHO | 12 | 88 | 20 | 44.8 | 9.2 | 11.1 | 16.0 |
| C | PHO | 12 | 88 | 30 | 70.8 | 7.6 | 9.6 | 15.8 |
| D | PEI 600 | 6 | 94 | 5 | 7.6 | 11.2 | 13.3 | 18.8 |
| E | PEI 600 | 6 | 94 | 10 | 15.4 | 11.4 | 12.5 | 17.6 |
| F | PEI 600 | 6 | 94 | 20 | 32.6 | 9.6 | 11.7 | 15.6 |
| G | PEI 600 | 6 | 94 | 30 | 52.5 | 8.3 | 10.2 | 14.6 |
| H | PEI 600 | 12 | 88 | 10 | 18.0 | 10.4 | 12.4 | 18.0 |
| I | PEI 600 | 12 | 88 | 20 | 42.0 | 9.5 | 11.5 | 17.0 |
| J | PEI 600 | 12 | 88 | 30 | 70.1 | 8.7 | 10.6 | 17.0 |

The data of Table I show that wafers treated with an aqueous solution of a phosphorylated poly(2-ethyl-2-oxazoline) and FR-A ® generally demonstrate superior retention and moisture regain (hygroscopicity) properties.

Examples 7–8 and Comparisons K–N: Crib Test

Samples of Ponderosa pine were vacuum-pressure treated with various aqueous PAPA/FR-A ® compositions by the procedures described in Examples 1–6. The weight average molecular weight of the phosphorylated poly(2-ethyl-2-oxazoline) here used was also about 150,000. The treated samples were dried and tested according to the "Crib Test" defined in ASTM E 160-50 which specifies a temperature of 315° C. at a distance 17 inches above the burner grid and a moisture content of between 4 and 10 weight percent. The results are reported in Table II and demonstrate that wafers containing the phosphorylated poly(2-ethyl-2-oxazoline) have comparable fire retardancy to the wafers treated with other PAPAs.

TABLE II

| | Crib Test | | | | |
|---|---|---|---|---|---|
| | Aqueous Treating Solution[1] | | | | |
| Ex. | PAPA | PAPA (parts) | FR-A (parts) | Wt. Loss (%) | Phosphorus (%) |
| 7 | PS-PEO | 12 | 88 | 29 | 4.4 |
| 8 | PS-PEO | 6 | 94 | 31 | 3.6 |
| Com. | | | | | |
| K | PHO | 12 | 88 | 25 | 3.9 |
| L | PHO | 6 | 94 | 27 | 4.3 |
| M | PEI 600 | 12 | 88 | 28 | 3.5 |

TABLE II-continued

| | | Crib Test | | |
|---|---|---|---|---|
| | | Aqueous Treating Solution[1] | | |
| Ex. | PAPA | PAPA (parts) | FR-A (parts) | Wt. Loss (%) | Phosphorus (%) |
| N | PEI 600 | 6 | 94 | 28 | 4.2 |

[1] All solutions at 10% solids.

Examples 9-14 and Comparisons O-Q: Two Foot Tunnel Test

The vacuum-pressure treating procedure of Exaples 1-6 was repeated (except exposure to the treating solution was at 200 psi for 30 minutes) to prepare various plywood samples for a determination of a "Flame Spread Rating". The determinations were made by following the procedures described by H. L. Vandersall, "Use of a Small Flame Tunnel in the Laboratory Evaluation of Flame Spread Rating", Special Report No. 6090 (May 5, 1964). The samples were weighed before and after each test burn to determine their weight loss. Both 50 percent (50-PS-PEO) and 85 percent (85-PS-PEO) phosphorylated poly(2-ethyl-2-oxazoline) (325,000 weight average molecular weight) were evaluated. Flame spread rating and weight loss are reported in Table III.

TABLE III

| | | Two Foot Tunnel Test | | | | |
|---|---|---|---|---|---|---|
| | | Aqueous Treating Solution | | | Flame | Wt. |
| Ex. | PAPA | PAPA (parts) | FR-A (parts) | Solids (%) | Spread Rating | Loss (%) |
| 9 | 50-PS-PEO | 6 | 94 | 20 | 18.0 | 3.5 |
| 10 | 50-PS-PEO | 6 | 94 | 20 | 18.0 | 3.5 |
| 11 | 50-PS-PEO | 12 | 88 | 20 | 18.0 | 4.2 |
| 12 | 50-PS-PEO | 12 | 88 | 20 | 21.2 | 4.3 |
| 13 | 85-PS-PEO | 6 | 94 | 20 | 24.3 | 4.6 |
| 14 | 85-PS-PEO | 6 | 94 | 20 | 18.0 | 3.7 |
| Com. | | | | | | |
| O | PEI 600 | 12 | 88 | 10 | 44.0 | — |
| P | PEI 600 | 12 | 88 | 20 | 30.0 | — |
| Q | PEI 600 | 12 | 88 | 30 | 23.0 | — |

The data of Table III demonstrate the superior flame retardancy of wood samples treated with a phosphorylated poly(2-ethyl-2-oxazoline)/FR-A ® solution to those treated with a branched polyethylenimine. Indeed, the flame spread ratings for Examples 11-14 were either superior or comparable to the flame spread rating for Comparison Q, even though Comparison Q was treated with an aqueous solution having 50 percent more slides than those of Examples 11-14.

Although the invention has been described in considerable detail as regards 50 percent phosphorylated poly(2-ethyl-2-oxazoline) and a fire retardant formulation of mono- and dibasic ammonium phosphate, such detail is for the purpose of illustration only and many variations and modifications can be made by one skilled in the art without departing from the spirit and scope of the appended claims.

What is claimed is:

1. A composition comprising a phosphorylated poly-2-oxazoline having a weight average molecular weight of at least about 1000, the poly-2-oxazoline being about 25 to 90 percent phosphorylated, and an inorganic salt fire retardant formulation.

2. The composition of claim 1 wherein the weight average molecular weight of the phosphorylated poly-2-oxazoline is at least about 100,000.

3. The composition of claim 2 comprising at least about 2 weight percent of the phosphorylated poly-2-oxazoline.

4. The composition of claim 3 comprising at least about 50 weight percent of the fire retardant formulation.

5. The composition of claim 2 comprising between about 5 and 20 weight percent of the phosphorylated poly-2-oxazoline and between about 80 and 95 weight percent of the fire retardant formulation.

6. The composition of claim 2 wherein the phosphorylated poly-2-oxazoline is between 40 and 70 percent phosphorylated.

7. The composition of claim 2 wherein the phosphorylated poly-2-oxazoline is poly(2-methyl-2-oxazoline, poly(2-ethyl-2-oxazoline) or poly(2-H-2-oxazoline).

8. The composition of claim 7 wherein the fire retardant formulation comprises about 20 to 80 weight percent monoammonium phosphate.

9. The composition of claim 7 wherein the fire retardant formulation comprises about 35 to 45 weight percent monoammonium phosphate with the remainder being diammonium phosphate.

10. Wood containing the composition of claim 1.

11. A wood composite containing the composition of claim 1.

12. A wood-derived product containing the composition of claim 1.

13. A method of imparting fire retardancy to a cellulosic substrate, the method comprising contacting the substrate with a fire retardant amount of a solution of the composition of claim 1.

14. The method of claim 13 wherein the solution is aqueous.

15. The method of claim 14 wherein the solution comprises at least about 5 weight percent, solids basis, of the composition.

16. The method of claim 14 wherein the solution comprises between about 10 and 20 weight percent, solids basis, of the composition.

17. The method of claim 16 wherein the substrate is contacted with at least about 0.005 pound of composition per square foot of substrate surface.

18. The method of claim 16 wherein the weight average molecular weight of the phosphorylated poly-2-oxazoline is at least about 100,000.

19. The method of claim 18 wherein the composition comprises between about 5 and 20 weight percent of the phosphorylated poly-2-oxazoline and between about 80 and 95 weight percent of the fire retardant formulation.

20. The method of claim 19 wherein the phosphorylated poly-2-oxazoline is between 40 and 70 percent phosphorylated.

21. The method of claim 20 wherein the phosphorylated poly-2-oxazoline is poly(2-methyl-2-oxazoline), poly(2-ethyl-2-oxazoline) or poly(2-H-2-oxazoline).

22. The method of claim 21 wherein the fire retardant formulation comprises about 35 to 45 weight percent monoammonium phosphate with the remainder diammonium phosphate.

23. The method of claim 22 wherein the substrate is wood.

24. The method of claim 22 wherein the substrate is a wood composite.

25. The method of claim 22 wherein the substrate is a wood-derived product.

26. The method of claim 22 wherein the substrate is paper-coated hardboard or paper-coated particle board.

27. The method of claim 22 wherein the substrate is veneer-surfaced particle board.

28. A composition comprising a phosphorylated poly-2-oxazoline of claim 1 having a weight average molecular weight of at least about 1000, the poly-2-oxazoline being about 25 to 90 percent phosphorylated, and an inorganic salt fire retardant selected from monoammonium phosphate, diammonium phosphate, ammonium sulfate, boric acid, zinc chloride, sodium dichromate and potassium tetraborate, or combinations thereof.

* * * * *